Jan. 1, 1957 D. C. WILKERSON 2,775,910
SPEED RESPONSIVE FLUID CONTROL MEANS
Filed Jan. 15, 1951 4 Sheets-Sheet 3
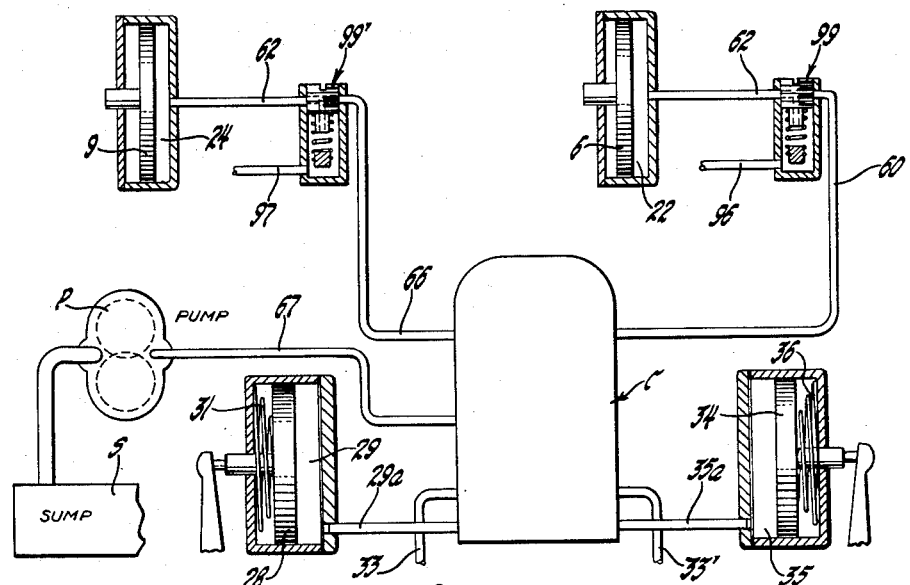
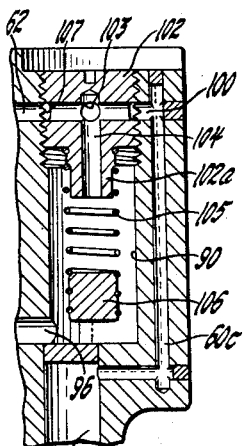
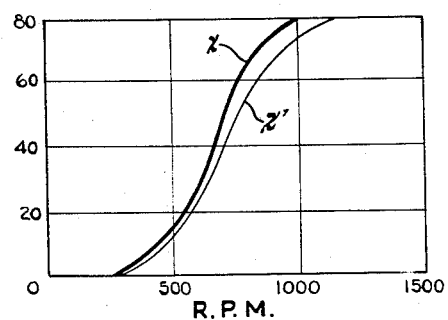
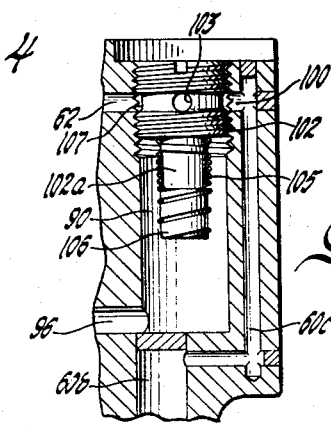
Inventor
Daniel C. Wilkerson
By Willits, Helmig & Baillio
Attorneys

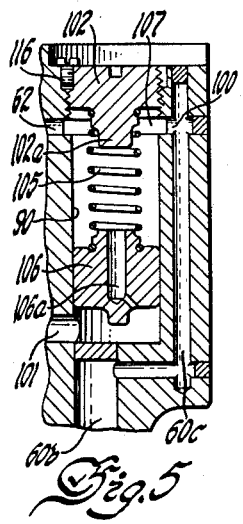 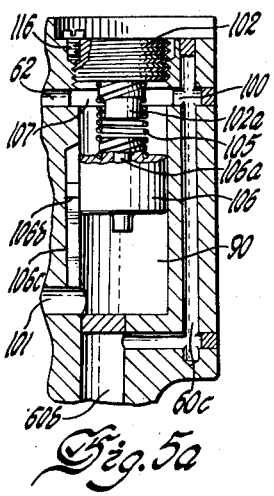 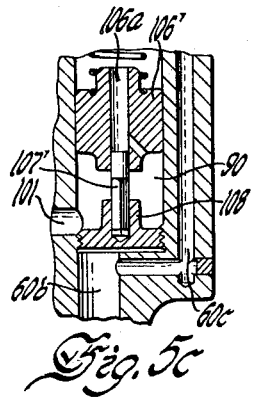 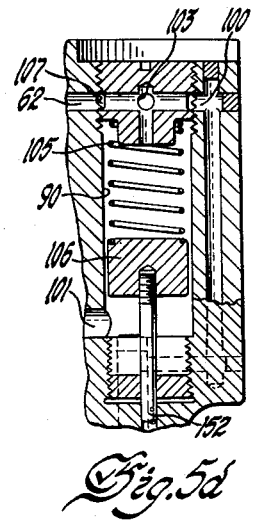
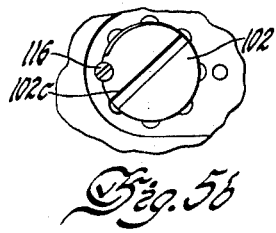 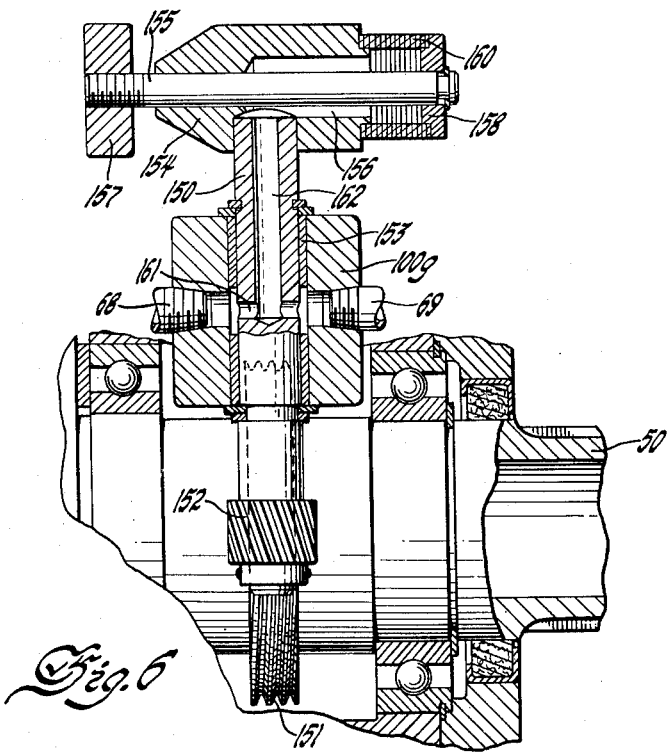

United States Patent Office 2,775,910
Patented Jan. 1, 1957

2,775,910

SPEED RESPONSIVE FLUID CONTROL MEANS

Daniel Coyle Wilkerson, Detroit, Mich., assignor to General Motors Corporation, Detroit, Mich., a corporation of Delaware Application January 15, 1951, Serial No. 206,044

36 Claims. (Cl. 74—751)

This invention relates to transmissions and more particularly to control systems for step-ratio transmissions of the type having fluid pressure actuated servomotors for selectively choosing the gear ratio of the transmission. The invention contemplates the use of a novel form of valve responsive to fluid pressure and/or centrifugal force for regulating the torque capacity of ratio-changing friction members in a step-ratio transmission and for regulating the torque capacity of friction clutch members generally.

Various types of valves have heretofore been employed for the purposes set forth above, but such valves have not been entirely satisfactory for a variety of reasons. For example, many of the valves formerly employed in such systems have been found to inherently embody undesirable performance characteristics, while all such valves have been extremely expensive in that much careful and accurate machining is necessary to obtain a permissible standard of performance. Valves constructed in accordance with the teachings of this invention are found to be very inexpensive and highly satisfactory in control systems provided they are selected for use in accordance with the orifice and pressure values required by the system.

By this invention a simple coil spring is utilized as a valve. The utility of the coil spring as a valve is based on the fact that present-day springs are manufactured of standardized materials, are heat-treated and processed and formed on automatic machines with a high degree of accuracy, such that their stress responses dovetail with the requirements for valve action, especially in dynamic pressure systems in which a small amount of constant leakage is not only permissible but highly desirable for filtering, cooling, and lubrication circulation. Heretofore coil springs have been made by less accurate processing and were not adaptable to the uses set forth herein. The present-day commercial coil spring is, however, sufficiently accurate in its physical properties to perform the work outlined in this specification, provided it is duly guided to maintain its axial relationship under deflection.

An object of this invention is to provide a transmission drive control system incorporating a novel valve particularly adapted for use in fluid pressure control systems.

A further object of this invention is to provide in a transmission control system incorporating a fluid pressure servo mechanism, a novel coil spring valve for regulating fluid pressure supplied to the servo means.

Another object of this invention is to provide a novel valve for regulating fluid pressure and incorporating a self-cleaning feature whereby seating of the valve is insured and undesirable sticking of the valve due to foreign matter is prevented.

An additional object of this invention is to provide a coil spring valve in which the tension in the spring coils may be readily and simply adjusted as may be desired.

Still another object of this invention is to provide a novel valve particularly adapted for use in transmission control systems characterized by its long serviceable life, trouble free performance, and economy of manufacture.

A further object of this invention is to provide in a transmission control system a valve structure for controlling fluid pressure supplied to the transmission servo members and in which the valve is responsive to speed of rotation and to inertia effects due to acceleration and deceleration of the speed of rotation of the valve, the inertia effect being superimposed upon the speed effect and decreasing with increase in speed, but increasing with decrease in speed of rotation of the valve.

These and many other objects of this invention will be apparent from the following description and claims, taken in conjunction with the accompanying drawings, in which:

Figure 3 is a schematic diagram of control plumbing and valve arrangement for activating the fluid pressure servos of the clutches and brakes.

Figure 4 illustrates one form of pressure regulator valve in section, the valve being in open position.

Figure 4a is a view similar to Figure 4 illustrating the valve of Figure 4 in closed position.

Figure 4b is a graph illustrating the operation of the structure of Figures 4, 4a showing the relationship between speed and pressure rise in the passages connected to the inlet port of the pressure regulator valve illustrated therein.

Figure 5 is a sectional view of a modified form of valve in which the high pressure is applied external of the spring valve.

Figure 5a illustrates a modified version of the valve shown in Figure 5 in which the external plug may be used as a spring tension adjuster.

Figure 5b is a plan view of the valve shown in Figure 5a illustrating the end plug and retaining means whereby the end plug may be fixed against rotation upon adjustment of the tension of the spring valve of Figure 5a.

Figure 5c is a sectional view of an alternate arrangement for preventing rotary motion of the valve plug within the casing upon the application of tension to the spring valve, which arrangement may be substituted for that illustrated in Figure 5a.

Figure 5d is a sectional view illustrating a modification of the valve shown in Figure 4 and incorporating means operable external of the valve chamber for varying the flow of pressure fluid through the valve.

Figure 6 illustrates an alternate form of spring valve which may be substituted for the valves illustrated in Figures 4 and 5.

Figure 1:
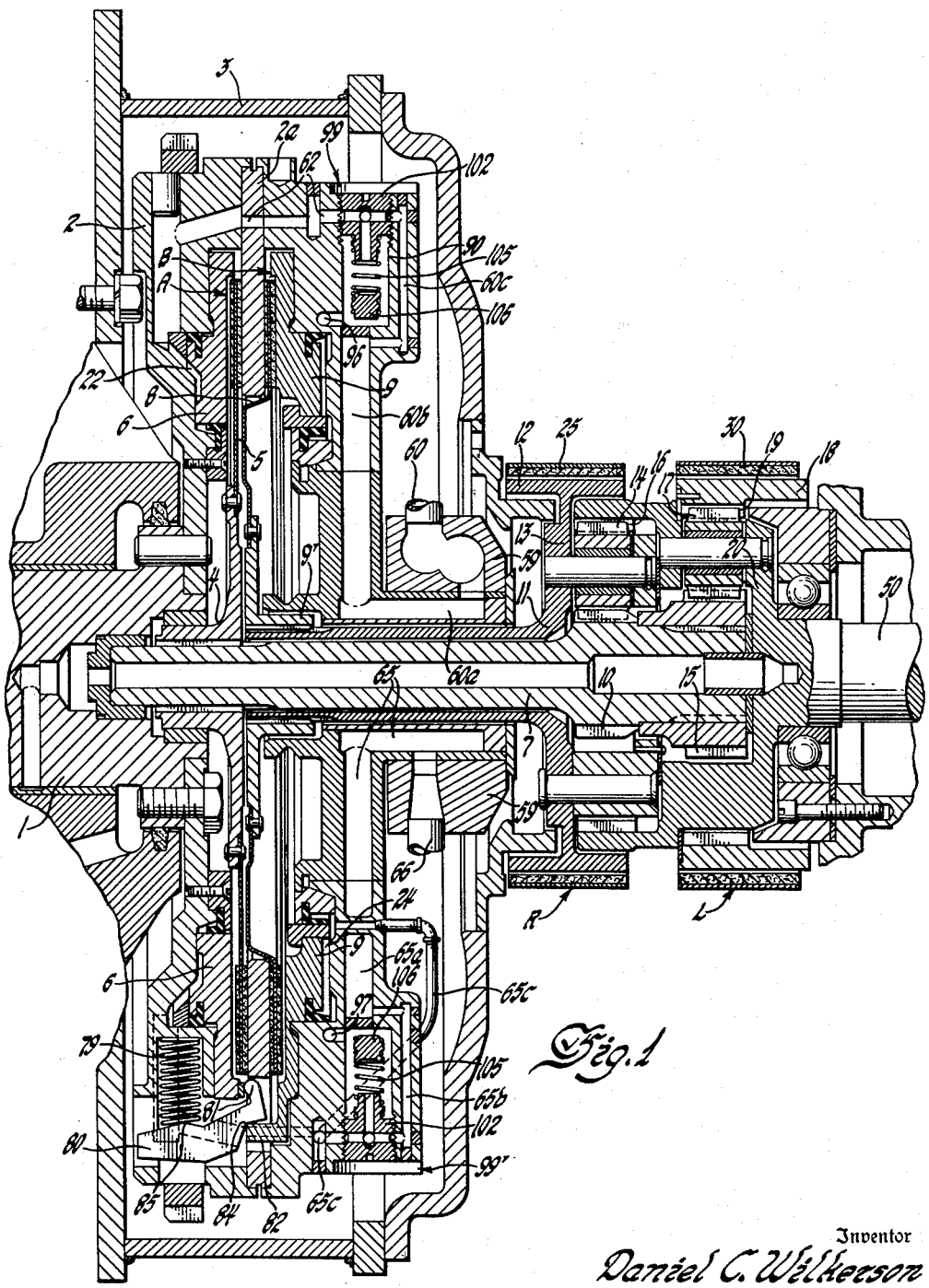
Figure 1 is a longitudinal section of a transmission incorporating a valve constructed in accordance with the principles of this invention.

Referring to Figure 1, there is shown a drive shaft 1 fixed to a hollow flywheel assembly 2 adapted to rotate within a casing 3. Flywheel 2 carries an internal annular web 2a on each side of which and completely within the flywheel is a pair of fluid pressure applied or operated clutches. The front clutch A is composed of a hub 4 splined to a driven shaft 7 and carrying a clutch plate element 5 adapted to be pressed against the front surface of web 2a by means of an annular piston 6. Piston 6 is actuated by fluid pressure applied to annular cylindrical space 22 through passage 62, and controlled by valve 99. Pressure is admitted to valve 99 through pipe 60 in gland 59, through passages 60a, 60b and 60c. The rear clutch B comprises a similar hub 9' splined to a hollow driven shaft 11 and carrying a clutch plate 8 adapted to be pressed against the rear surface of web 2a by an annular piston 9. Piston 9 is actuated by fluid pressure applied to annular cylindrical space 24 from pipe 66, through delivery passage 65 and pipe 66 in gland 59. Passage 65 communicates through passage 65a to passage 65b, the fluid pressure being admitted to cylinder 24 through passage 65c. Exhaust fluid through passages 96 and 97 is directed back to the pump sump. The control of fluid pressure to pipes 60 and 66 may be brought about in any conventional manner as by means of a thimble valve adapted to selectively connect the pipes to a fluid pressure source or to cut both pipes off from the fluid pressure source. It will be clear that when clutch A is energized, torque is transmitted from shaft 1 to shaft 7, and when clutch B is energized, torque is transmitted from shaft 1 to shaft 11.

Valve device 99 is mounted in drilled passage 90 in the flywheel body and is a speed responsive device for regulating the magnitude of the line 9 pressure applied to piston 6 through passage 62. Details of the valve are discussed more fully hereafter. Valve 99' may be of similar structure to regulate pressure applied to piston 9 through passage 65 and annular space 24. Various modifications of the valve 99, any one of which may be used, as desired, in place of valve 99 are illustrated in the accompanying figures hereafter described in further detail. Valves 99 and 99' are permitted to vent variably to exhaust through ports 96 and 97, respectively.

Figure 2:
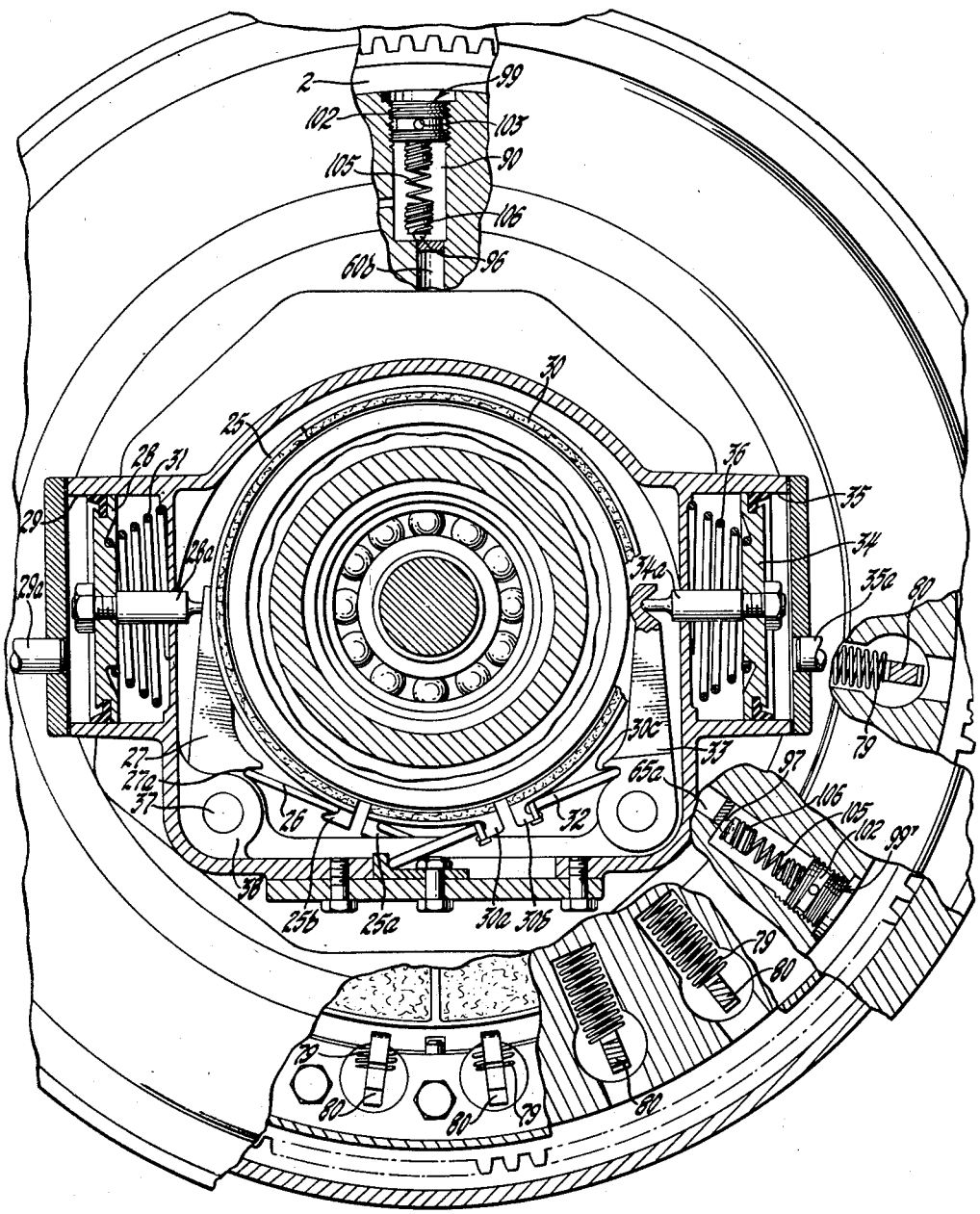
Figure 2 is a view of the assembly of Figure 1 broken away from part sections to show the device control elements.

To counteract the clutch-binding effect of high centrifugal forces on the fluid in cylinders 22 and 24 of engageable clutch mechanisms A and B, the clutch pistons are associated with counterbalancing centrifugal means comprising a series of circumferentially spaced pivotal weights. As shown in Figures 1 and 2, each weight 80 is pivoted at 84 on the rim of an extension plate 82 of piston 9 and has a claw 81 engaging the outer rim of piston 6. Weight 80 is engaged at 85 by the outer end of radially compressed springs 79 in a recess in the flywheel. As the speed of the flywheel reaches its top permissible value the weight 80 moves outwardly, pivoting at 84 and thus forcing piston 6 to the left (Figure 1) and piston 9 to the right. In this way, by proper proportioning of springs 79 and weights 80, clutch drag at low speeds is avoided by the effect of springs 79, and excessive centrifugal force of the actuating kind is avoided by the effect of the weights.

As previously indicated, clutches A and B transmit drive to coaxial shafts 7 and 11 which connect the clutch mechanism to epicyclic gearing behind clutch casing 3. The gearing comprises a front unit R and a rear unit L. Inner shaft 7 carries two sun gears 10 and 15, the former meshing with planet gears 14 mounted on carrier 13 attached to shaft 11 and which also mesh with ring gear 16 of carrier 20. Sun gear 15 meshes with planet gears 17 mounted on carrier 20 and which also mesh with ring gear 19 on drum 18. Front carrier 13 has a drum 12 adapted to be engaged and held by a brake band 25, and drum 18 is adapted to be engaged and held by a brake band 30. Rear carrier 20 is attached to the final load shaft 50.

By means of this gearing and the clutches, it is possible to obtain three forward gear ratios and one reverse ratio as follows. In neutral position, clutch A is engaged and both brakes 25 and 30 are disengaged. For low gear, clutch A and brake 30 are engaged. Drive is then from shaft 1, clutch A, shaft 7, sun gear 15, planet gears 17, carrier 20, and shaft 50.

For second gear clutch A is released and clutch B is engaged while brake 30 remains engaged. Drive is then from shaft 1, clutch B, shaft 11, carrier 13, planet gears 14, and to both sun gear 10 and ring gear 16. Sun gear 10 drives shaft 7 and sun gear 15 at a higher speed than in low gear; while gear 16 drives carrier 20 carrying planet gears 17 which engage with sun gear 15. The result of this splitting and compounding of the drive is to rotate shaft 50 at a higher speed than in low gear, for a given engine speed.

For top gear, brake 30 is released and both clutches A and B are applied. This locks the entire gearing together so that it rotates as a unit at engine speed, giving a direct drive of output shaft 50.

For reverse drive band 30 is released, band 25 is engaged and clutch A is energized. Drive is then from shaft 1, clutch A, shaft 7, sun gear 10, planet gears 14, ring gear 16, carrier 20, and shaft 50.

The mechanism for operating brakes 25 and 30 is shown in Figure 2 where part of brake 25 is cut away to show brake 30 and its mechanism. Each of the mechanisms is operated by fluid pressure under the control of valve devices which coordinate the operation of the brakes and clutches, as is well known in the art.

The band of brake 25 is anchored at one end by a rod fitting in a notch 25a and is operated at its other end by a rod 26 fitting in a notch 25b on the band and another notch 27a on a lever 27. The lever is pivoted about a rod 37 supported in a suitable bracket 38, and its upper end is moved by a rod 28a on a piston 28 in a cylinder 29. The piston is moved against a release coil spring 31 when pressure is applied to the cylinder through pipe 29a.

The band on brake 30 is similarly arranged and operated. It is anchored at one end by a rod fitting in notch 30a and operated at the other end by a rod 32 fitting in notches 30b and 30c, the latter being provided in lever 33 which is moved by piston stem 34a on piston 34 in cylinder 35. Pressure applied to pipe 35a moves piston 34 against release coil spring 36 to apply the brake.

In Figure 3 there is shown a schematic diagram of control for supplying fluid pressure to cylinders 22, 24, 29, 35 as desired.

Pipes 60 and 66 of Figure 1, as well as pipes 29a and 35a of Figure 2 lead to a valve control mechanism C adapted to selectively direct fluid pressure to any one of the pipes individually or in combination as may be desired, such valve controls being well known in the art. Pump P pumps fluid pressure from supply sump S through pipe 67 to selector control valve housing C containing suitable valving (not shown) for selectively directing fluid to pipes 29a, 35a, leading to cylinders 29 and 35 and to pipes 60, 66 leading to cylinders 22 and 24. Fluid pressure from cylinders 29 and 35 exhausts through passages 33 and 33' respectively, while fluid pressure from cylinders 22 and 24 is permitted to exhaust through exhaust passages 96 and 97. The exhaust fluids are directed back to sump S.

The construction of Figure 4 represents a usage of the valve construction of the invention applied to the clutch mechanism of Figure 1. The radial drilled space 90 in flywheel housing 2 acts as the valve chamber, the externally located valve inlet port 100 being connected through the proper passages to the clutch chamber and to a source of fluid pressure of unvarying pressure level, or variable as needs require. The inner passage 96 leads from the valve bore to exhaust space, or to the spent pressure reservoir. Port 107 leads to passage 62 of Figure 1, which in turn communicates with the servo cylinder for actuating the clutch 5.

The outer portion of the bore 90 is closed by the screw plug 102 threaded into the flywheel body 2 of Figure 1 and is cross drilled at 103 for registry with the port 100, being centrally drilled at 104 through the extension 102a which acts as a guide for spring valve 105, fitted with weighted plug 106 at the inner end.

Under rotation of the flywheel 2, the turns of the spring valve 105 may remain open until the rotational speed reaches a value at which they are compressed and the flow of fluid is restrained, and therefore there is a rise of pressure inside the turns of the spring valve 105, as the plug 106 under centrifugal force, moves toward the position shown in Figure 4a, between which there is variable exhaust.

The fluid which formerly flowed out through the elongated wide apertures of spring valve 105 is now restrained to flow through a much smaller space by shrinkage of the interstitial areas between the compressed spring coil turns, as well as by reason of the turns effective to provide fluid passage becoming less in number as the turns compress radially beyond the effective pressure relief space of the chamber 90. At maximum speed effect, the spring valve 105 is fully compressed, and the upper face of the plug 106 seats against this matching seat of the hollow spindle 102a, exposing pressure area of smaller extent. Upon fall of speed or rise of effective pressure in the passages connected to 100, the plug 106 becomes unseated and the variable leakage action of valve 105 is restored. If the external controls affecting the value of the pressure head on the valve 105 and plug 106 are so manipulated, a controlled rise of such pressure could be effective to open valve 105 against the speed effect, and cause a drop in pressure sufficient to diminish the holding pressure on the clutch 5 of Figure 1. Such pressure rise can only function up to the maximum orifice capacity of the relief passages, such as 96, however, so that the designer may utilize the latter effect to prevent undesired high pressure rise from slipping the clutch. The pressure fed to port 100 as provided by the pump P of Figure 3, may for example, be at 80 pounds to the square inch, and supplied in such volume that the clutch 5 of Figure 1 will be fully engaged when the leakage of spring valve 105 is reduced below an effective orifice area of 0.0035 square inch, for example. From this point on, with increase of speed, the spring valve 105 may fully compress as noted above and come to rest with the plug 106 seated, so that no leakage whatever occurs. In practice, a small amount of continuous leakage is preferable, by which plug 106 would not ever block the orifice except at excessive speeds, momentarily reached.

The radially outer face of the plug element 106 acts as a pressure responsive valve seat surface, so that the pump pressure and trapped pressure tend to open the turns of the spring valve 105 and relieve the line 100.

Due to the fact that the spring wire is of circular section, the out flow velocity between close adjacent turns tends to accelerate while the actual orifice pressure at a point between two adjacent turns rises, tending to hold them open by fluid pressure elongation of the body of the spring valve 105. This characteristic tends to blast free small particles of dirt or foreign matter which ordinarily cause trouble in fluid pressure valving, and the fact that there are many minor readjustments of the forces at work in a short time period adds further to the self-cleaning and pressure stabilizing action. It will be noted that toward the end of travel in which the spring valve 105 is nearly closed, a component of the fluid pressure is tending to stretch or expand the spring diametrally and thereby decreases its overall length in contrast to the pressure acting on the upper face of the plug 106 which gives an effect of cushioning toward the end of the travel.

The structure shown in Figures 4 and 4a embodies a weighted plug element 106, which is free to turn about the spring valve axis without restraint. The upper end of the spring valve 105 may be staked into the plug 102 so that these parts are removed as an assembly, although this is not necessary, except for special design reasons to be dealt with further.

The chart of Figure 4b provides a representation of the operation of the structure of Figures 4 and 4a, showing increase of speed compared with rise of pressure in the pressure passages connected to line 100, indicating the pressure loading on the clutch 5 of Figure 1, in full line at X.

In Figure 5 a different arrangement of the regulating spring valve is given, the higher line pressure being applied external to the spring turns and the lower pressure existing inside the spring valve when the spring is compressed. The spring element 105 is retained in chamber 90 by a screw plug 102 with extension 102a acting as a guide for the spring valve 105 compressed by the radial force of sliding plug 106 weighted to respond to centrifugal force. At low speeds of flywheel 2, there is free flow through the turns of the spring 105 from pressure passage 60c to relief passage 101 which exhaust to sump. With increase of speed the valve 105 is compressed as shown in Figure 5a. The weighted plug 106 is drilled out centrally as at 106a. This form of combination valve is somewhat less sensitive to line pressure variations since it is exposed to high pressure only over a small ring-shaped area near the cylindrical periphery. With respect to the outlet pressure, plug 106 is partially balanced. At excessive or extreme speeds the plug 106, by design, may be made to abut the inner end of boss 102a of plug 102, thus aiding the blocking of bleed leakage from 60c to 101. The plug 106 need be only a running fit in bore 90. Should the spring ends be staked into the plugs, or recessed so as to not rotate freely, allowance is made for rotation of plug 106. Should the upper spring end be recessed in a hole in plug 102, or otherwise so retained, and the plug 106 prevented from rotation, the spring may be placed under a pre-load or in pre-stressed condition by winding of the turns with rotation of the plug 102 to a predetermined angular lock point. Variations of such an arrangement are illustrated in Figures 5a, 5b and 5c. This adjustment permits accurate setting after installation, for desired speed response characteristics, as against the involved process of pre-calibration, since the physical factors of minor orifice effect and friction of plug 106 in the bore 90 may vary sufficiently to make accurate setting otherwise difficult. For such a purpose, the plug 106 may have an extension lug 106b riding in a radial slot 106c as indicated in dashed line in Figure 5a, or it may be guided and held against rotation on its own center by an arrangement as shown in Figure 5c, where the inner end of a stem 107' on the plug 106' is milled to square section to match with the square inner section of a raised boss 108. The fit of these square sections is not critical since the fluid pressure in passage 106a is the same as below the plug. Figure 5b is a plan view of the top of the plug 102 as used for pre-loading the element 105, set-screw 116 serving to hold a pre-set adjustment. A slot 102c is provided in plug 102 so that the tension of spring 105 may be readily and quickly adjusted as desired.

In Figure 5d, the construction is like that of Figure 4 but the plug 106 is tapped for overcontrol rod member or element 152 which may be utilized to vary the position of plug 106 in valve chamber 90 manually or automatically.

Figure 6 shows an alternate embodiment of my invention in which a single pressure regulator valve may be substituted for the pair of regulator valves heretofore described. This alternative embodiment is adapted to be positioned in the hydraulic system between the pump P and the manually operable selection valving C of Figure 3, and the individual pressure regulator valves 99 and 99' will therefore be omitted. Specifically, the alternate pressure regulator will be positioned in line 67 of Figure 3, while lines 60 and 66 of Figure 3 will be connected directly to cylinders 22 and 24, respectively.

In Figure 6, there is shown a centrifugal valve form of pressure regulator or governor having a shaft 150 driven by meshing worm gears 151 and 152 from the shaft 50 of Figure 1. Shaft 150 is supported in housing 100g by means of bushing 153, and has fixed to its upper end a valve body 154 drilled for a slidable rod 155, and bored to form space 156. Rod 155 has affixed thereto a calibrated weight 157 at the left end and the rod is fastened to a retainer member 158 at its right end. The rotation of shaft 150 and body 154 tends to increase the kinetic force of weight 157, causing the weight to move outwardly radially. A spring 160 is closely recessed against the body 154 at one end, and at the other end fits closely into a formed ledge in retainer 158, the spring 160 acting to resist the outwardly acting centrifugal force of weight 157 on rod 155.

The housing 100g is drilled for connections 68 and 69 so that pump pressure from pipe 67 enters at 68, while pressure fed to the intake side of the selector valve C is conducted through 69. Shaft 150 is cross-drilled at 161 to register with connections 68 and 69, the bushing 153 also being so apertured. Shaft 150 is centrally drilled at 162 to intersect with cross drillings 161 and is open to bore space 156 of body 154.

Assuming that the pressure regulator is disposed in the hydraulic system in line 67 of Figure 3 between the pump and manual selector valve and that shaft 150 is not rotating, the pressure in bore space 156 is exerted to stretch spring 160 to the right and to leak off or exhaust the pressure of the system to the exhaust space and back to the sump, the pressure in the system thereby being maintained at a low net pressure level determined by the capacity of the supply pump and the spring turn orifice dimensions.

Rotation of shaft 150 applies centrifugal force to rod 155, to hold retainer 158 toward the left and compress the turns of spring 160, thereby restricting the leakage through the spring turns and accordingly raising the pressure of fluid fed to the selector valve and to the servo-motors. An equilibrium condition of centrifugal force as against fluid pressure tending to relieve the line pressure within the system is reached for each steady rotational speed of shaft 150. The adjacent turns of spring 160 are therefore utilized as a valve having a long seat with respect to the stroke of the valve action.

At high vehicle speed ranges of shaft 150, as indicative of high vehicle or output speeds the permitted leakage is at a minimum, this value being calculated for and calibrated so as to permit a small substantially continuous vent flow for the system such that the oil body may be constantly circulated for desired cooling requirements.

The valves of Figures 4 and 5 with the loose plug construction of Figure 4 whereby the plug is spaced from the valve bore 90, and the running fit of the plug in the bore of Figure 5 are free from sticking at either end of the plug travel, and may operate continuously and indefinitely without wear or loss of design characteristics. It is especially difficult for dirt or foreign particles to lodge in the interstices of the spring valve turns due to velocity increase effects in the flow. For example, if in the Figure 4 embodiment a metal fragment is lodged between adjacent turns, thereby holding them apart to create leakage, the sealing of the adjacent turns by flexure of the spring material under axial pressure causes the leakage flow to build up in the turn area directly adjacent the fragment so that it is dislodged quickly by the rise of velocity flow and pressure. In this manner the device is self-cleaning and particles of larger diameter than the normal turn spacing may be squeezed through with facility. When clogging occurs, the quick and simple removal of plug 162 permits rapid examination of the entire assembly, repair and replacement.

In the Figure 4 embodiment, a lateral clearance space has been shown between the cylinder wall 90, plug 106, and the external surface of the turns of spring valve 105. It will be understood that under rotation, the conditions of acceleration or deceleration will tend to cause the spring 105 and plug 106 to swing away from the bore centerline or radial axis and to incline so as to lag or lead at the inner end where the plug 106 is located. This inertia effect results in bowing or distorting the spring slightly, opening the turns on one side or another, but diminishes as speed increases, since the moment arm of valve 105 and plug 106 about the fulcrum point of the retainer guide 102a is lessened as the spring becomes shorter. The same effect occurs under deceleration and is regulated in design by the masses, moment arm, and force resistance value of the spring valve, to control the permitted bowing of the spring.

In the Figure 5 embodiment the clearance space of plug 106 forms a close running fit so that the inertia effect due to acceleration or deceleration is provided only in the body of spring 105. The turns of spring 105 may be designed to lie so close to cylinder wall 90 that the inertia effect is practically absent.

The result of this feature, however, is to enable the designer to proportion these effects to suit the desired drive and torque capacity requirements of the brakes and clutches, and also to introduce a speed plus inertia governing action into an automatic or manually controlled shift ratio pattern.

If, for example, the driver is accelerating in low gear from an engine idling speed of about 250 R. P. M., as illustrated in Figure 4b, the net valve closure under speed and fluid pressure effect may cause the clutch 5 of Figure 1 to increase loading according to the engine speed-pressure curve X. The inertia effect may, by design, cause the clutch loading pressure to rise more gradually. The bowing of the spring 105 permits more pressure to leak out than would leak if the acceleration were more gradual, giving a pressure-speed curve as illustrated at X' of Figure 4b. This acceleration-deceleration effect results in smoother clutch engagement and reduced shock loading.

Upon deceleration, as by retarding the vehicle engine throttle or by braking the vehicle or both, from say about 2000 R. P. M., or around 20 miles per hour, the plug and element 105 of Figure 4 can swing off the spring axis, and as the speed falls off the effective moment arm increases, thereby increasing the inertia effect. While the net decelerative force falls, the proportional effect of inertia persists; whereas, under acceleration the inertia effect dies out with the rate of increase of acceleration due to the shortening of the moment arm as the spring is compressed and as the turns of the spring progressively move outwardly past the end of guide member 102a.

The provision of an inertia effect superimposed upon a speed effect to oppose the same decreasingly with increase in speed but rising with increase of acceleration, and to provide an inertia effect which is created by deceleration but which tends to remain while the speed is diminished due to the varying moment arm action described above is believed novel.

Since in motor vehicle operation sudden increases in acceleration or deceleration tend to produce shock loads on the driving parts and couplings; it is often advantageous to ameliorate these effects by some form of limiting control calibrated to suit the torque forces to be dealt with, and the spring valve arrangement herein for providing a predetermined inertia factor control as outlined above, introduces a cushioning action in the cyclic torque capacity actuation system for the clutches.

Having disclosed various modifications of a spring valve pressure regulator and the manner in which it may be incorporated in a transmission control system, the invention intended to be protected is set forth in the following claims.

I claim:

1. A governing mechanism for controlling apparatus to be governed comprising a rotating body, a chamber in said body, a coil spring in said chamber having a series of successive, open coil turns, a weight member disposed in said chamber and connected to compress the spring turns with respect to a portion of the body under rise of rotational speed and provide a variable flow through the said turns, a fluid pressure supply passage connected to said chamber exterior of said coil spring, an exhaust passage from said chamber operative to receive pressure fluid passing through the coil turns of said spring, a pressure delivery passage connecting said chamber to said apparatus to be governed, a passage through said weight member for permitting fluid flow from the interior portion of said coil spring to said exhaust passage, said weight being movable in response to variation in speed of rotation of said body to vary the space between adjacent coils of said coil spring, the pressure supplied to said chamber through said pressure supply passage being operative upon said weight to oppose the centrifugal force effect of said weight in determining the relative spacing of adjacent coil turns of said coil spring.

2. A centrifugally actuated pressure control valve comprising a rotatable valve body having a valve chamber therein, a coil spring disposed in said chamber, said coil spring being fixed at one end and free at the opposite end, fluid pressure supply, delivery and exhaust ports associated with said chamber, a weight member secured to the free end of said coil spring so as to require fluid flow through the coil turns of said coil spring from the said supply, and a passage through said weight member for permitting fluid flow from the interior portion of said coil spring to said exhaust port, said weight member and said spring being variably movable in response to variation in speed of rotation of said valve chamber to vary the space between adjacent coils of said spring.

3. A centrifugally actuated pressure control valve comprising a valve body adapted for rotation about a given axis of rotation, a valve chamber in said body extending perpendicular to said axis of rotation, a coil spring mounted to expand and contract in said chamber having a fixed end and a free end, said coil spring extending perpendicular to said axis of rotation, a weight member fixed to the free end of said coil spring so as to require fluid flow through the coil turns of said coil spring, and fluid pressure supply, delivery and exhaust ports associated with said chamber, said supply and exhaust ports being positioned with respect to said coil spring such that fluid flow from said supply to said exhaust port is directed between the coils of said coil spring, said weight member being movable in response to variation of speed of rotation of said body to vary the spacing of adjacent coils of said coil spring with respect to each other, and correspondingly vary the degree of outflow to the said exhaust port, the fluid pressure admitted to said chamber through said pressure supply port acting upon said weight member in opposition to the centrifugal force effect of said weight member.

4. A centrifugally actuated pressure control valve comprising a rotatable body, a valve chamber in said body, a coil spring valve in said body having a fixed end and a free end, a weight member fixed to the free end of said coil spring valve adapted to restrict the free end turns of said spring valve against fluid flow through the coil turns of said valve, an exhaust passage in said body, and fluid pressure supply and delivery ports connected to a space associated with said coil spring, said weight being movable in response to variation in the speed of rotation of said body to vary the spacing between adjacent coils of said coil spring to vary the rate of fluid flow through the coil turns of the said spring valve from said fluid pressure supply to said exhaust passage, the fluid pressure admitted to the space within the turns of said coil spring being applied to said weight member in opposition to the centrifugal force effect of said weight member upon said spring valve.

5. A centrifugally actuated pressure control valve comprising a rotatable body, a valve chamber in said body, a coil spring valve in said chamber having a fixed end and a free end, a weight member fixed to the free end of said coil spring valve, said weight member being effective to divide said chamber into higher and lower pressure portions, respectively, fluid pressure supply and delivery ports connected to the higher pressure portion of said chamber with respect to said coil spring valve, an exhaust port connected to the lower pressure portion of said chamber, and a passage for permitting fluid flow from the lower pressure portion of said chamber to said exhaust port, said weight being movable in response to variation in speed of rotation of said valve chamber to vary the spacing between adjacent coils of said coil spring valve, the fluid pressure in said higher pressure portion of said chamber being operative upon said weight member to oppose the centrifugal force effect of said weight member upon said coil spring valve.

6. A centrifugally actuated pressure control valve device comprising a body subject to rotary motion, a valve chamber therein, a plug member closing off one end of said valve chamber, a nipple on said plug extending into said valve chamber, a coil spring valve having one end thereof secured to said plug positioned with a portion of its coils extending intermediate said plug and the end of said nipple and a portion of its coils extending inwardly past said nipple to present a free end in said valve chamber, a weight member carried by the free end of said coil spring valve effective under rise of speed to compress said spring valve and thereby to block off the successive turns thereof against fluid flow through the coils of the spring valve, and fluid pressure supply, delivery and exhaust ports in said body positioned with respect to said coil spring valve such that fluid pressure flowing from said pressure supply to said exhaust port is directed between the coils of said coil spring valve, said weight member being movable in response to variation of the rate of rotation of said body to vary the relative spacing adjacent coils of said spring to vary the rate of fluid flow to said exhaust port, the fluid pressure admitted to said chamber through said pressure supply port being operative upon said weight in opposition to the centrifugal force effect of said weight upon said coil spring valve.

7. A centrifugally actuated pressure regulator valve comprising a rotatable valve body having a valve chamber therein, a plug member blocking off one end of said valve chamber, a nipple on said plug extending into said valve chamber, a valve seat on said nipple, fluid pressure inlet and delivery passages in said plug, a coil spring valve in said chamber positioned with a portion of its coils extending radially inward of said body and adjacent said nipple and a portion of its coils extending similarly into said chamber beyond the end of said nipple to present a movable end in said chamber, a passage in said nipple connecting the interior of said coil spring to said pressure supply and delivery passages, an exhaust port in said valve chamber, a weight member secured to the movable end of said coil spring valve for preventing fluid flow through the movable end of said valve, said weight member being movable in response to variation in the rate of rotation of said valve body to vary the spacing between adjacent coils of said coil spring valve, and a valve seat on said weight adapted to register with said nipple valve seat under extreme centrifugal force, said exhaust port being positioned to receive fluid passing intermediate the coils of said spring.

8. A centrifugally actuated pressure regulator valve comprising a valve body subject to rotary motion, a valve chamber in said body, a plug member at one end of said valve chamber, a coil spring valve in said chamber having one end thereof seated upon said plug, a weight member adapted to move the other end of said coil spring valve, said weight member being positioned in said chamber for linear motion therein and fixed against rotary motion with respect to said chamber, said plug being adapted to be rotated with respect to said chamber to vary the tension of said coil spring valve, and fluid pressure supply, delivery and exhaust ports associated with said valve chamber, said supply and exhaust ports being positioned with respect to said coil spring valve such that fluid pressure passing from said supply to said exhaust port is directed through the coils of said valve, said weight being movable with respect to said end plug in response to variation in the speed of rotation of said valve body to vary the space between adjacent coils of said coil spring, the fluid pressure supplied to said valve through said pressure supply port being applied to said weight in opposition to the centrifugal force effect of said weight upon the coils of said coil spring valve.

9. A pressure control valve comprising a rotatable body, a valve chamber in said body, fluid pressure inlet, delivery and exhaust ports associated with said valve chamber, a coil spring valve disposed in said chamber having one end thereof fixed at one end of said chamber and a movable end extending into said chamber and spaced from the walls of said chamber, and a weight member secured to the movable end of said coil spring valve effective to compress said coil spring valve as the speed of rotation of said body is increased, said weight member also being effective during periods of acceleration and deceleration of said body to bend said coil spring valve out of normal alignment so as to vary the spacing between adjacent coils of said valve, said inlet, delivery and exhaust ports being positioned with respect to said coil spring valve such that fluid passing from said inlet port to said exhaust port is directed between the turns of said spring.

10. A centrifugally actuated pressure regulator valve comprising a rotatable valve body, a valve chamber in said body, fluid pressure supply, delivery and exhaust ports communicating with said valve chamber, a coil spring valve disposed in said valve chamber having one end retained by said body and a movable free end extending into said chamber, and a weight member fixed to the free end of said coil spring valve, said coil spring valve being disposed in said valve chamber such that inertia forces acting upon said coil spring valve will bend said coil spring with respect to the axis of said chamber during periods of acceleration and deceleration of said valve body, the inertia effect of said valve spring acting in opposition to the centrifugal effect of said weight during periods of acceleration of speed of rotation of said valve body and said inertia effect of said valve spring acting in assistance to the effect of said weight during periods of deceleration of the speed of rotation of said valve body, said fluid pressure supply, delivery and exhaust ports being positioned with respect to said coil spring valve such that fluid passing through said valve chamber is directed between the turns of said coil spring valve.

11. A centrifugally actuated pressure control valve comprising a rotatable valve body, a valve chamber in said valve body, fluid pressure inlet, delivery and exhaust ports communicating with said chamber, a coil spring valve disposed in said chamber, said coil spring valve having sectional abutment at one end of said chamber and having a movable end extending radially into said chamber and spaced from the walls of said chamber, a weight connected to the movable end of said spring effective to prevent fluid flow through the open end of said spring, said weight being movable in said chamber to compress said coil spring valve upon increase of speed of rotation of said valve body, said spring valve presenting a variable moment arm decreasing in length as said coil spring is compressed and increasing in length as the coil spring is extended, said weight being effective to compress said spring upon increase in speed of rotation, said spring being positioned in said chamber such that inertia forces acting upon said spring will bend said spring out of radial alignment during periods of acceleration and deceleration of the speed of rotation of said valve body, said inertia effect being superimposed upon the speed effect of said weight to oppose the same decreasingly with increase of speed of rotation of said valve body and to oppose said speed effect increasingly with increase in acceleration of said valve body, said inertia effect acting in assistance to said speed effect during deceleration of the speed of rotation of said valve body and increasing in effectiveness as the rate of deceleration of said valve body increases, said inlet and exhaust ports being positioned with respect to said coil spring valve such that fluid passing from said inlet port to said exhaust port is directed between the turns of said coil spring valve.

12. In power control devices in combination, a mechanism to be variably controlled, a fluid pressure actuator for said mechanism operative to provide such required variable operation, a fluid delivery passage providing variable fluid pressure to said actuator for said mechanism, a fluid pressure supply source, a pressure supply passage leading from said source, an exhaust space, a rotating control device including a valve body and a valve bore in said body, fluid connections for said passages and said exhaust space in said body, and a centrifugally operable valve located in said bore effective to vent variably the pressure of said supply passage to said exhaust space and thereby cause the pressure of said delivery passage to vary in accordance with changes of speed of said device, said centrifugally operable valve including a coil spring member located in said valve bore having a series of coil turn portions effective to be compressed or elongated in accordance with such speed variation and thereby provide the said variable vent action through the said turns of the spring.

13. A centrifugally actuated pressure regulator valve device comprising a rotatable valve body operated at varying speeds of rotation, a radially disposed valve chamber in said body, a fluid pressure supply connected to said chamber, a valve weight member having a portion movable radially within said chamber, a pressure delivery passage operatively connected to said chamber, an exhaust space, a coil spring connected to said weight member and normally having open coil turns operative to permit flow passage of fluid from said chamber to said exhaust space related to said member such that upon rise of rotational speed of said body, the coil turns are caused to be variably closed and thereby variably restrict the said flow through said turns in accordance with said rise of speed and thereby operative to cause a corresponding rise of pressure in said delivery passage.

14. In a change-speed transmission which includes a plurality of step-ratio gear trains, and plural clutches adapted to be engaged in a selective pattern of engagement for establishing drive by said trains between driving and driven shafts, a source of fluid pressure, control valving operative to direct the pressure of said source for actuating said clutches in said pattern, fluid pressure operated actuator means for said clutches, fluid pressure passages for connecting said source and said valving to said means, and a regulating valve located in at least one of said passages, said valve including a coil spring capable of elongation and compression and responsive to the speed of said driving shaft to elongate or compress for varying the flow between the turns of said coil spring and thereby causing the clutch actuating pressure of said one passage to rise with the said shaft speed.

15. In the combination set forth in claim 14 the subcombination of a second regulating valve means including a second coil spring in another of said passages likewise subject to driving shaft speed and operative in the same manner as described for said first-named valve to cause the actuation pressure of its clutch passage to rise with rise of said shaft speed.

16. In power transmitting mechanism, a friction clutch driving member, a driven member to be engaged with said driving member, a clutch actuator operable to engage the clutch under the application force of fluid pressure, regulating means operable to provide variable exhaust for the clutch-applying fluid pressure including a coil spring valve mounted to rotate with said driving member and having its axis radial with respect to the rotation of the clutch, a weight member operatively associated with said coil spring, the open turns of the coil spring being variably closed by action of centrifugal force on said weight member in accordance with the rise of speed of said driving member thereby to restrict the variable exhaust action, and a valve chamber surrounding said valve and spaced laterally from the sectional coil dimension of the coil spring valve so as to permit its deflection from its radial axis under inertia force and provide a distortion of the coil turns for increasing the exhaust action.

17. In power transmissions, driving and driven shafts, wherein a change-speed gear train is adapted to couple said shafts for drive at differing speed ratios, having a first friction clutch operable to establish initial drive and continue drive, of the driven shaft through the said train at a given low speed ratio, and having a second friction clutch operable to engage and transmit a different speed ratio from that established by the first clutch through the said train while the first-named clutch is being released from driving, a fluid pressure actuation system for both said clutches including a pressure supply and directing valving to select drive by one or the other or both of the clutches, the selected clutch being engaged and actuated by the fluid pressure directed to it by the valving, and a speed responsive valve subject to centrifugal force of a valve member rotating with said engine shaft and operable to regulate the fluid pressure force directed to said second clutch during the interval when the said first-named clutch is being released, said valve including a coil spring valve element caused to compress its successive coil turns variably with rise of speed of said engine shaft, and thereby cause the clutch pressure force to rise with such rise of speed.

18. In the combination set forth in claim 12, the subcombination including a pressure space within the turns of the coil spring and connected to said supply passage, a closure member of said valve for one end of said spring, and a pressure area of said closure member responsive to the pressure of said passage for modifying the centrifugal speed response variation of said valve.

19. In the combination recited in claim 12, the subcombination of mechanical connection operative to apply an overcontrol force to the said valve and to vary the venting action from that otherwise determined by the centrifugal operation of the valve in accordance with changes in the speed of rotation of said mechanism.

20. In the combination recited in claim 13, the further combination of an overcontrol element operative by external connection to shift said member portion to predetermined positions for selective regulation of the flow between the coil turns of the spring other than determined by the rotational speed of said body applied to said portion.

21. In power drive controls, in combination, a control member, an engageable clutch element, a fluid pressure actuated piston and cylinder structure operable to apply engaging force to said element, a fluid pressure supply, a pressure delivery connection to said cylinder, a control valve operated by said control member for selectively controlling the operation of said piston upon said element by selective control of delivery to said cylinder from said supply through said connection, an exhaust space, a regulating valve device in said connection including a coil spring with turns operative to vent the pressure thereof variably to said space and thereby vary the effective pressure acting upon said piston for engaging said element, a coil spring portion of said device having open turns through which the pressure of said connection is variably vented to said space, a rotating valve body mounting said valve and said spring, and a centrifugal force responsive element rotating with said body and operative by the centrifugal force acting upon the said element to vary the spacing of said coil spring turns in accordance with changes in the rotating speed of said body.

22. In clutch controls for power transmission mechanism, which have in combination, a rotatable driving member, a driven member, a clutch for said members, fluid pressure operable means for causing actuation and engagement of said clutch, a pressure delivery passage for said means, selector valving for controlling the pressure delivered by said passage to said means, a member for shifting said valving to render the said means operative and inoperative, the combination of regulating means driven by said driving member for controlling the magnitude of the pressure in said passage and acting upon said fluid pressure operable means, said regulating means including a rotatable casing, a valve bore in the casing, a coil spring valve element movable radially with respect to the axis of rotation of said rotatable casing in said bore and a weight member subject to centrifugal force and carried by said coil spring element, said valve element having open turns through which the pressure of said passage is vented more rapidly at one speed than at another speed of rotation of said casing.

23. In transmission mechanism having the combination of a power shaft, a load shaft, change speed mechanism between the two shafts for changing the speed ratios therebetween, a fluid pressure supply pump, a pressure supply connection from said pump, ratio selector valving, a plurality of clutches embodied in said mechanism and selectively engageable in a pattern to provide different speed ratios, fluid pressure actuators for each clutch and pressure delivery connections for each actuator adapted to be connected to said supply connection by said valving to provide said clutch engaging pattern, the combination of coil spring pressure regulator valves located in each of said delivery connections operable to bleed off a variable quantity of the pressure delivered by said valving, said regulator valves each having a rotating body responsive to speed of rotation, each of said valves including a weight member subject to centrifugal force developed in said body by said rotation, each of said valves having multiple open turns which are variably opened or closed by action of the weight associated therewith to vary said bleed in accordance with changes in the speed of rotation of said body.

24. In power transmission, driving and driven shafts, a friction clutch for connecting said shafts, a fluid servo actuator for applying engaging force to said clutch to provide unit speed of said shafts, an actuator conduit, a fluid pressure supply system including a pressure source, valving for delivering pressure from said source to said actuator through said conduit, or for cutting off said delivery, and the combination of a pressure-varying regulator device for the pressure supplied by said valving to said conduit and said actuator, including a rotating valve chamber connected to said conduit containing a centrifugal relief valve which includes a coil spring and a weight member, the turns of said coil spring being variably compressed by centrifugal force response of said weight member to vary the relief of the pressure of said chamber.

25. A pressure regulator comprising a valve chamber, a fluid pressure source, means for rotating said valve chamber, means connecting said valve chamber to said source of fluid under pressure, fluid pressure exhaust and delivery ports in said chamber, spring means effective to control the rate of flow of fluid from said chamber to said exhaust port so as to vary the pressure in said delivery port, and a weight subject to said rotational motion of said valve chamber for compressing said spring upon increase in speed of rotation of said valve chamber to thereby variably increase the pressure supplied to said delivery port upon increase in speed of rotation of said valve chamber.

26. A pressure regulator device for regulating the fluid pressure delivered from a source, said device including a rotatable valve chamber, a coil spring valve disposed in said chamber, an inlet port in said valve chamber, a delivery passage leading from the chamber, an element movable to compress said spring valve in accordance with the speed of rotation of the chamber to increase the pressure supplied to said delivery passage upon increase in speed of rotation of said valve chamber, said spring valve and said passages being positioned such that fluid passing through said chamber passes between the turns of said spring valve.

27. A device for regulating pressure supplied from a source of fluid under pressure comprising a valve chamber positioned for rotational motion, a coil spring valve disposed radially with respect to the axis of rotation of said valve chamber in said valve chamber, an inlet port in said valve chamber, a pressure delivery port in said valve chamber, an element in said valve chamber movable radially with respect to the axis of rotation of said valve chamber by centrifugal force in response to rotary motion of said chamber for compressing said spring valve, and an exhaust port in said chamber, said inlet and exhaust ports being positioned with respect to the coil turns of said spring valve such that fluid passing through said chamber is exhausted between the turns of said spring, said spring valve being effective to increase the pressure supplied to said delivery passage upon increase in rotational speed of said valve chamber.

28. A device for variably controlling fluid pressure comprising a rotating valve chamber, an inlet port in said valve chamber, a coil spring valve disposed radially with respect to the axis of rotation of said valve chamber in said valve chamber, a centrifugally responsive element directly operative for varying the relative spacing of the turns of said coil spring valve, an outlet port in said chamber, said inlet and exhaust outlet being positioned relative to said spring valve such that fluid passing through said chamber is directed between the coil turns of said spring valve.

29. A centrifugally operable pressure regulator device for regulating fluid pressure comprising a valve chamber subjected to rotary motion, a plug member of said chamber including a nipple extending into said chamber, passages in said plug member and nipple adapted to connect said valve chamber to a source of fluid under pressure, a coil spring mounted radially with respect to the axis of rotation of said valve chamber in said chamber with a portion of its turns intermediate said plug and the end of said nipple and a portion of its coils lying inwardly of said nipple in said chamber, a weight element in said chamber movable radially with respect to the axis of rotation of said chamber in response to rotary motion of said chamber for varying the relative spacing of said coil spring turns, an outlet port in said chamber positioned such that fluid passing through said chamber to the outlet port passes between the coil turns of said spring.

30. A centrifugally operable valve means for regulating pressure comprising, a valve chamber subjected to rotary motion, a plug member including a nipple extending into said chamber, a valve seat formed on the inner face of said nipple, passages in said plug and nipple adapted to connect said chamber to a source of fluid under pressure, a coil spring in said chamber positioned with a portion of its coils extending outwardly around said nipple and a portion extending inwardly from said nipple into said valve chamber, a weight element in said valve chamber operative to block off the free end of said coil spring against fluid flow and adapted to compress said spring centrifugally in response to rotary motion of said chamber, a valve seat formed on said weight adapted to register with said first-mentioned nipple valve seat under action of centrifugal force, and an exhaust port in said valve chamber positioned to receive fluid passing intermediate the coils of said spring.

31. A device responsive to centrifugal force for regulating pressure comprising a valve chamber subjected to rotary motion, a plug member permanently closing off one end of said valve chamber, a second, movable plug member slidably positioned for radial motion with respect to the axis of rotation of said valve chamber in said valve chamber, a coil spring disposed in said chamber intermediate said plugs, an opening in a wall of said chamber adapted to be connected to a source of fluid under pressure, an exhaust port in said chamber, and a passage in said second, movable plug providing communication between the space interior of said coil spring and said last-mentioned port.

32. A device responsive to centrifugal force for regulating pressure comprising a valve chamber subjected to rotary motion, an affixed plug member in one end of said valve chamber, a reduced portion of said plug extending into said valve chamber and having a valve seat formed thereon, an opening in said valve chamber providing communication between the interior of said valve chamber and a conduit, a second plug slidably positioned in said chamber for radial movement with respect to the axis of rotation of said chamber and fixed against rotary motion with respect thereto, a coil spring positioned in said chamber intermediate said extension and said second plug, a valve seat formed on said second plug adapted to seat on said first-mentioned valve seat when said chamber is rotated above a predetermined speed, said spring being retained by both of said plugs and said affixed plug being adapted to be rotated with respect to said chamber so as to vary the tension in said coil spring, a passage through second-mentioned plug providing communication between the space interior of said spring and the adjacent end of said chamber, and an exhaust port for fluid passing through said passage.

33. A valve device for regulating fluid pressure including a valve chamber subject to rotary motion, inlet and outlet ports and an exhaust port in communication with said valve chamber, a coil spring valve disposed in said chamber for radial motion therein with respect to the axis of rotation of said chamber and spaced from the wall thereof, an element responsive to centrifugal force for compressing said spring, said spring valve being positioned in said chamber to permit a limited bending motion of said coil spring valve in response to variation of the rate of change of speed of rotation of said chamber, and said inlet, outlet, and exhaust ports being positioned with respect to said valve such that pressure fluid passing from said inlet port to said exhaust port passes between the turns of said coil spring valve.

34. A valve device for regulating fluid pressure including a valve chamber subject to rotation, pressure inlet, outlet, and exhaust ports communicating with said valve chamber, a coil spring valve disposed in said chamber for radial motion with respect to the axis of rotation of said chamber and spaced from the wall thereof, said spring having normally open turns, an element responsive to centrifugal force for compressing the turns of said spring, the spring being positioned in said chamber such that the inertia effect of said spring and said element tends to bend said spring with respect to the axis of said chamber upon change of the speed of rotation of the chamber, said inertia effect acting in opposition to the effect of increase of said centrifugal force of said element and said inertia effect acting in assistance to said centrifugal force responsive element upon decrease in the speed of rotation of said valve chamber, said inlet, outlet, and exhaust ports being positioned with respect to said valve such that fluid passing through said chamber passes between the turns of said spring.

35. A valve device for regulating pressure including a valve chamber subject to variations in speed of rotation, pressure inlet, outlet, and exhaust ports communicating with said chamber, a coil spring disposed in said chamber for radial movement with respect to the axis of rotation of said chamber and spaced from the lateral walls thereof, a weight element connected to said coil spring and movably positioned in said chamber so as to compress said coil spring variably with increase of speed of rotation of said chamber, the variable moment arm of the spring decreasing in length as it is compressed and increasing in length as it is extended, said spring being positioned in said chamber such that under acceleration of such rotation speed the spring tends to bend, and under increase of the speed of rotation of said chamber, the speed effect tends to oppose the acceleration effect, said inertia effect acting in assistance to said speed effect upon deceleration of the speed of rotation of said valve body and increasing in effectiveness as the rate of deceleration of said valve body increases.

36. In speed-controlled mechanisms, the combination of a device to be governed in accordance with governing changes in speed of a shaft, a pressure-applying member adapted to operate said device by variations of applied pressure to the member, a pressure supplying pump arranged to provide a steady source of pressure, a governor mechanism including a rotating valve body connected to said pump and to said pressure applying member, said shaft driving said body at variable speeds, a fluid pressure exhaust passage in said body, said body having a valve chamber therein a coil spring disposed in said chamber so as to require fluid flow from said pump to said exhaust passage through the coil turns of said coil spring, and a weight arranged to move radially with respect to the axis of rotation of said valve body upon change of speed of rotation of said valve body and to compress the spring turns with rise of speed of said valve body and thereby restrict the outflow of fluid through said coil turns from said exhaust passage.

References Cited in the file of this patent

UNITED STATES PATENTS

| | | |
|---|---|---|
| 125,937 | Cowles | Apr. 23, 1872 |
| 342,275 | Walters | May 18, 1886 |
| 1,029,097 | Atkinson | June 11, 1912 |
| 1,189,697 | Kasley et al. | July 4, 1916 |
| 1,760,315 | Nacket | May 27, 1930 |
| 2,095,770 | Sorensen | Oct. 12, 1937 |
| 2,155,247 | Warner | Apr. 18, 1939 |
| 2,217,940 | Bragg | Oct. 15, 1940 |
| 2,325,814 | Tyler | Aug. 3, 1943 |
| 2,363,279 | Anschicks | Nov. 21, 1944 |
| 2,396,361 | Browne | Mar. 12, 1946 |
| 2,440,589 | Kegresse | Apr. 27, 1948 |
| 2,549,090 | Hobbs | Apr. 17, 1951 |
| 2,633,760 | Kelley | Apr. 7, 1953 |